US006194507B1

United States Patent
Ali

(10) Patent No.: US 6,194,507 B1
(45) Date of Patent: Feb. 27, 2001

(54) METAL FILLED CONCENTRATE

(75) Inventor: Mir L. Ali, Bryan, OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/385,198

(22) Filed: Aug. 30, 1999

(51) Int. Cl.$^7$ .................................................. C08K 3/10
(52) U.S. Cl. .................... 524/441; 524/430; 524/779; 524/783; 524/786
(58) Field of Search ................................ 524/399, 427, 524/428, 430, 441, 568, 569, 570, 585, 586

(56) References Cited

U.S. PATENT DOCUMENTS

| | | | |
|---|---|---|---|
| 4,374,641 | 2/1983 | Burlone | 8/557 |
| 4,617,056 | * 10/1986 | Mosser et al. | 106/1.12 |
| 4,724,172 | * 2/1988 | Mosser et al. | 427/383.5 |
| 4,810,733 | 3/1989 | Sakuma et al. | 523/206 |
| 4,848,915 | 7/1989 | Fintel | 366/76 |
| 4,897,136 | 1/1990 | Bailey et al. | 156/145 |
| 4,919,872 | 4/1990 | Fintel | 264/103 |
| 4,983,661 | 1/1991 | Ali et al. | 524/423 |
| 5,147,912 | 9/1992 | Moore | 524/101 |
| 5,328,657 | * 7/1994 | Kamel et al. | 419/36 |
| 5,358,533 | * 10/1994 | Noiles et al. | 623/22 |
| 5,405,892 | 4/1995 | Krishnan et al. | 524/114 |
| 5,455,288 | 10/1995 | Needham | 523/205 |
| 5,478,878 | * 12/1995 | Nagaoka et al. | 524/230 |
| 5,594,186 | * 1/1997 | Krause et al. | 75/228 |
| 5,670,561 | 9/1997 | Scheibelhoffer et al. | 523/351 |
| 5,843,524 | 12/1998 | Wimolkiatisak et al. | 427/212 |
| 5,932,309 | * 8/1999 | Smith et al. | 428/46 |

* cited by examiner

*Primary Examiner*—Edward J. Cain
*Assistant Examiner*—Katarzyna Wyrozebski
(74) *Attorney, Agent, or Firm*—Rankin, Hill, Porter & Clark LLP

(57) ABSTRACT

The present invention provides a new and improved color concentrate comprising from about 10% to about 30% by weight metal particles component, from about 1% to about 15% by weight colorant material and from about 60% to about 90% by weight thermoplastic polymer. The metal particles component comprises aluminum particles having both a spherical and a lenticular shape. The concentrate can be utilized to color thermoplastic polymers and produce a matte metallic effect.

14 Claims, No Drawings

METAL FILLED CONCENTRATE

FIELD OF INVENTION

The present invention concerns a color concentrate for use in coloring plastics. More particularly, the present invention concerns a metal containing thermoplastic color concentrate (masterbatch) for use in imparting a metallic effect or appearance to the thermoplastic polymer that is being colored.

BACKGROUND

Thermoplastic polymers are often colored in the molten state by the addition of color concentrates. Color concentrates are highly loaded dispersed colorants in a carrier polymer. The carrier polymer being either the same chemistry, with higher melt flow characteristics as or compatible with the polymer to be colored. Color concentrates are generally used to ensure good dispersibility and incorporation of pigments and other additives. Use of color concentrates can also create a much cleaner environment for an end user who does not have to involve oneself with dusty colorants and other hard to handle materials.

There are several methods for adding a color concentrate to a thermoplastic polymer that is to be colored. However, the most common method utilized today involves the controlled metering of the color concentrate into the throat of a polymer extruder or injection molding machine using pellet feeders. In this application, the concentrate is supplied in a pellet form.

Color concentrates containing metal particles are known in the prior art. Such concentrates are utilized to impart a metallic look or effect to polymers. However, to date, the use of such concentrates has presented a variety of problems including poor incorporation or distribution of the metal within the polymer, low metal loading levels that fail to produce a meaningful metallic effect in the polymer being colored and the formation of knit lines, flow lines, diration lines and other molding marks upon use of the colored polymer. Moreover, such concentrates have commonly been made using a wax carrier, and waxes at higher concentrations are undesirable in many applications. The present invention affords a metal filled color concentrate that overcomes these deficiencies.

SUMMARY OF INVENTION

The present invention provides a new and improved metal containing color concentrate that affords a variety of advantages including a high metal content, good metal distribution and pigment dispersibility and distribution, minimal adverse influence on the physical properties of the polymer being colored and good molding characteristics. The concentrate of the present invention is used to produce a flat or brushed metallic appearance in the polymer that is being colored.

The color concentrate of the present invention comprises from about 10% to about 30% by weight metal particles component, from about 1% to about 15% by weight colorant material (pigment), and from about 60% to about 90% by weight thermoplastic polymer. The metal particles component comprises a bimodal distribution of particles that exhibit both a lenticular and a spherical distribution. The metal particles component comprises from about 70 to about 95 percent by weight lenticular shape aluminum particles having an average particle size of from about 20 to about 75 $\mu$m, and from about 5 to about 25 percent by weight spherical shape aluminum particles having an average particle size of from about 20 to about 75 $\mu$m. The color concentrates of the present invention include less than about 5% by weight wax, and preferably the concentrate will have a melt flow similar to that of the thermoplastic polymer being colored.

These and other aspects of the present invention will become clear to those skilled in the art upon the reading and understanding of the specification and the claims below.

DETAILED DESCRIPTION

Color concentrates made in accordance with the present invention yield various advantages. These advantages include: (I) the production of a concentrate that provides good dispersion and distribution when added to the thermoplastic polymer being colored; (ii) the production of colored thermoplastic polymer that displays a significant metallic look or effect that produces a matte or brushed appearance in high light conditions (e.g., outdoors in full or almost full sunlight); and (iii) the absence ofknit lines, flow lines and diration lines upon molding of the colored thermoplastic polymer. The formation of knit lines is avoided because the metal particles do not pile up into a vertical orientation during molding. Additionally, knit lines are avoided because there is no agglomeration of metal particles within the thermoplastic polymer and the melt flow of the concentrate is controlled very close to the melt flow of the thermoplastic polymer that is being molded, and the concentrate is capable of providing a metal content in the polymer being colored of 1–2% by weight.

Color concentrates made in accordance with the present invention may utilize a variety of different thermoplastic carrier polymers or mixtures of such polymers. Waxes are not used as the carrier in concentrates of the present invention. Thus, the color concentrates of the present invention comprise less than 5% by weight wax. The thermoplastic carrier polymer may comprise an amorphous or crystalline material selected from the group consisting of a styrenic polymer, a vinyl halide polymer, polyamides and an olefinic polymer. The styrenic polymers include, for example, polystyrene, high impact polystyrene (HIPS), styrene/acrylonitrile copolymers (SAN), copolymers of acrylonitrile/butadiene/styrene (ABS) and substituted styrenes such as a-methyl styrene, methyl methacrylate, polysulphones and copolysulphones, polyphenylene oxides (PPO), polycarbonates, polymers and copolymers ofacetals, and thermoplastic polyurethanes. Polyamide polymers include, for example, Nylon 6, Nylon 6,6 and Nylon 6,12 and glass filled versions thereof. Vinyl halide polymers include, for example, poly(vinyl chloride) (PVC).

The olefinic polymers include, for example, polymers and copolymers of a-olefins such as polyethylene, polypropylene, polybutene, poly-4-methyl pentene-1, propylene/ethylene copolymers and copolymers of 4-methyl pentene-1 with linear a-olefins containing 4 to 18 carbon atoms.

Preferably, whatever polymer system is utilized, it is best if a significant portion of the polymer is supplied in powder form to ensure proper mixing. Use of a blend of powder and pellets helps to prevent the settling of the metal particles during mixing. Preferably, the powder accounts for from about 30% to about 70% by weight of the thermoplastic carrier. Also, preferably, whatever polymer system is used as the carrier, the color concentrate should have the same or a similar melt flow to the polymer that is to be colored.

The metal particles component of the present invention comprises a bimodal distribution of aluminum particles having both a spherical and a lenticular configuration. This bimodal particle size distribution has been found to be critical relative to the formation of a product with a matte metal effect. The metal particles component comprises from about 70 to about 95 percent by weight lenticular shape aluminum particles having an average particle size of from about 20 to about 75 µm, and from about 5 to about 25 percent by weight spherical shape aluminum particles having an average particle size of from about 20 to about 75 µm. Metal particles suitable for use in the present invention may be purchased from the Silberline Manufacturing Company, Inc. of Tamaqua, Pa.

The colorant material may comprise any one or more of a number of commercially available colors or pigments so as to provide the described color effect in the concentrate and the thermoplastic polymer that is to be colored. As used in this specification and claims below "colorant material" means any conventional inorganic or organic pigment or organic dyestuff. Such materials are described, for example, in *Kirk-Othmer Encyclopedia of Chemical Technology*, Third Edition, Vol. 6, pp. 597–617, which is incorporated herein by reference. Examples of inorganic pigments include, for example, titanium dioxide, iron oxide, zinc chromate, cadmium sulfides, chromium oxides and sodium aluminum silicate complexes. Examples of organic type pigments include azo and diazo pigments, carbon black, phthalocyanines, quinacridone pigments, perylene pigments, isoindolinone, anthraquinones, thioindigo and solvent dyes.

Various types of additives may also be included in the process. Such additives may include, for example, stabilizers and/or process aids such as alkaline earth metal soaps and carboxylates such as calcium benzoate, calcium octoate and calcium naphthenate, Friedel-Crafts cation progenitor compounds such as zinc oxide, zinc hydroxide, zinc carbonate, zinc acetate, zinc laurate, zinc naphthenate, zinc stearate, zinc oleate, zinc 2-ethyl-hexoate, cadmium oxide, cadmium hydroxide, cadmium carbonate, cadmium acetate, cadmium laurate, cadmium naphtheneate, cadmium stearate, cadmium oleate, cadmium 2-ethyl-hexoate, calcium stearate, aluminum oxide, aluminum hydroxide, aluminum carbonate, aluminum acetate, aluminum chlorolaurate, antimony oxide, antimony hydroxide, antimony carbonate, antimony naphthenate, tin oxide, tin hydroxide, tin carbonate, tin naphthenate, and tin 2-ethyl-hexoate, aliphatic polyhydric compounds such as trimethylolethane, trimethylolpropane, tetramethylolcyclohexanol, pentaerythritol, dipentaerythritol, and tripentaerythritol and tri-(2-hydroxyethyl) iso-cyanurate (THEIC). Waxes may be included, but at levels of less than 5% by weight of the color concentrate so as not to detrimentally effect the properties and molding characteristics of the uncolored thermoplastic polymer. Examples of such waxes include paraffins, castor oil waxes and ethylene bis-stearamide.

Various types of fillers and/or reinforcers may also be included in the concentrate. Such fillers and/or reinforcers include, for example, $CaCO_3$, barium sulfate, talc, glass, clay and mica.

The portions of polymeric resin, colorant material and metal particles component can vary quite a bit. Generally, when producing the concentrate, the mixture utilized comprises from about 60 to about 90 weight percent thermoplastic carrier polymer, from about 10 to about 30 weight percent metal particles component and from about 1 to about 15 weight percent colorant material. The mixture may comprise up to 8 weight percent additives. Preferably, the mixture comprises from about 65 to about 85 weight percent thermoplastic polymer, from about 12 to about 25 weight percent metal particles component, and from about I to about 10 weight percent colorant material.

The concentrate is formed in a two-step process. In both steps it is imperative that the mixing be low intensity and low shear in nature so as not to affect the particle size of the aluminum particles. The first step involves a premix of the various components in a mixer such as a Papenmeir mixer, a Waring blender or a Henschel mixer. A Henschel mixer is preferred. A low speed, of for example, 2–8 meters per second is preferred. Mineral oil may be added in minor amounts to the mix to help prevent dusting. The second step of the process involves the melt mixing of the premix in a melt mixer such as a single or twin screw extruder, or a Banbury mixer.

The above described color concentrate may be formulated in any desired physical form to be blended with uncolored (unformulated) thermoplastic polymers and processed into a molded or shaped article. It will be recognized by one skilled in the art, however, that for most molding and/or shaping processes, pellets of the concentrate are most advantageous for accommodating most molding and shaping apparatuses or processes, e.g., injection molding, extrusion molding or shaping, blow molding and the like.

The color concentrate will be blended with virgin (uncolored) thermoplastic polymer in an amount sufficient to give the desired matte metallic effect, and other such properties desired for the article to be formed. Generally, this amount will range in a ratio by weight from about 50 to 1 to about 5 to 1 of virgin polymer to the color concentrate. This blend ratio results in an approximate metal particles component concentration in the blend of from about .20% to about 4% by weight of the total blend. In a more preferred embodiment of the invention, the blend ratio will vary from about 25 to 1 to about 10 to 1 of the virgin polymer resin to the color concentrate.

The blend compositions made in accordance with the present invention may then be utilized to prepare a variety of different molded or shaped articles by various molding and shaping processes. For example, such molded articles as bottles, closures, automotive parts, toys, furniture and cabinet parts and the like. These molded articles may be prepared by such processes as injection molding, rotational molding, injection blow molding, sheet extrusion, film extrusion, blow molding, thermoforming and the like. For example, closures, toys and furniture parts may be prepared by injection molding. Bottles are generally prepared by injection and extrusion blow molding techniques and plastic bags are prepared from blow film.

Various compositions representative of concentrate compositions within the scope of the present invention are illustrated in the following examples. While these examples will show one skilled in the art how to operate within the scope of this invention, they are not to serve as a limitation on the scope of the invention for such scope is defined only in the claims. It is pointed out that in the following examples, and elsewhere in the present specification and claims, all percentages and all parts are intended to express percent by weight and parts by weight unless otherwise clearly indicated.

EXAMPLE I

Color concentrates A and B were formed by first mixing at low speed in a Henschel mixer 4 pound batches followed by melt mixing without screens in a single screw extruder.

After extrusion the concentrate was pelletized for easy handling.

Formulation A

| Component | Weight % |
|---|---|
| *Aluminum particles - 30 μm average particle size (lenticular) | 15.75 |
| *Aluminum particles - 25 μm average particle size (spherical) | 1.75 |
| Iron oxide | 1.52 |
| $TiO_2$ | 2.50 |
| Iron oxide (Mapico TAN20A) | .30 |
| Iron oxide (Harcross R2899-HP) | .10 |
| Acrawax (ethylene bis-stearamide) | 1.00 |
| Butyl stearate | 2.50 |
| Polypropylene powder (Montell 6301) | 37.26 |
| Polypropylene pellet (Montell PDC1194) | 37.26 |

*Aluminum particles available from Silberline Manufacturing Company, Inc.

Formulation B

| Component | Weight % |
|---|---|
| *Aluminum particles - 30 μm average particle size (lenticular) | 14.100 |
| *Aluminum particles - 25 μm average particle size (spherical) | 1.510 |
| $TiO_2$ | 6.00 |
| Iron oxide (Mapico TAN20A) | .035 |
| Iron oxide (Harcross R2899-HP) | .007 |
| Acrawax (ethylene bis-stearamide) | 1.000 |
| SAN powder (Network Polymers) | 41.374 |
| SAN pellets (Channel Polymers HF-5670) | 41.374 |

*Aluminum particles available from Silberline Manufacturing Company, Inc.

EXAMPLE II

The color concentrates A and B made as described in Example I were used at a 25:1 let-down ratio with the same polymers used as the carrier polymer in the color concentrate. The concentrates and virgin polymers were dry blended (let down) and then plaques were formed using an injection molding machine. The materials processed well and the plaques produced have a good matte metallic appearance with good pigment dispersion, good distribution of metal particles and an absence of molding defects and lines.

Although the invention has been shown and described above with respect to specific embodiments, it is obvious that equivalent alterations and modifications will occur to others skilled in the art upon reading and understanding the specification. The present invention includes all such equivalent alterations and modifications, and is limited only by the scope of the following claims.

What is claimed is:

1. A color concentrate for coloring uncolored thermoplastic polymers and producing a matte metallic effect, said concentrate comprising from about 10% to about 30% by weight metal particles component, from about 1% to about 15% by weight colorant material and from about 60% to about 90% by weight thermoplastic polymer, said metal particles component comprising aluminum particles having a spherical configuration and aluminum particles of a lenticular configuration.

2. A color concentrate as set forth in claim 1 wherein said spherical metal particles and said lenticular metal particles each display bimodal particle size distribution.

3. A color concentrate as set forth in claim 2 wherein said metal particles component comprises from about 70 to about 95 percent by weight lenticular shape aluminum particles having an average particle size of from about 20 to about 75 μm, and from about 5 to about 25 percent by weight spherical shape aluminum particles having an average particle size of from about 20 to about 75 μm.

4. A color concentrate as set forth in claim 1 comprising from about 65% to about 85% by weight thermoplastic polymer, from about 12% to about 25% by weight metal particles component, and from about 1% to about 10% by weight colorant material.

5. A color concentrate as set forth in claim 1 wherein said thermoplastic polymer comprises a material selected from the group consisting of styrenic polymers, olefinic polymers, vinyl halide polymers, polyamides and mixtures thereof.

6. A color concentrate as set forth in claim 1 including an additive.

7. A color concentrate as set forth in claim 1 including a filler.

8. A color concentrate as set forth in claim 1 including a processing aid.

9. A color concentrate as set forth in claim 1 comprising less than 5% by weight wax.

10. A method of forming a metal filled color concentrate for coloring thermoplastic polymers and producing a matte metallic effect comprising the steps of:

I. mixing at low intensity and low shear a mixture comprising about 10% to about 30% by weight metal particles component, from about 1% to about 15% by weight colorant material and from about 60% to about 90% by weight thermoplastic polymer so as to form a premix; and II. melt mixing said premix of said step I in a low intensity and low shear mixer, wherein said metal particles component comprises aluminum particles of a spherical configuration having an average particle size of from about 20 to about 75 μm and aluminum particles of a lenticular configuration having average particle size of from about 20 to about 75 μm.

11. A method as set forth in claim 10 wherein said mixing in said step I is performed using a Henschel mixer.

12. A method as set forth in claim 11 wherein said melt mixing in said step II is performed using an extruder.

13. A method as set forth in claim 10 wherein said thermoplastic polymer comprises from about 30% by weight to about 70% by weight powdered thermoplastic polymer.

14. A method as set forth in claim 13 wherein said thermoplastic polymer comprises a material selected from the group consisting of styrenic polymers, olefinic polymers, vinyl halide polymers, polyamides and mixtures thereof.

* * * * *